May 14, 1974         H. D. SWARTZ         3,810,806

THERMOPLASTIC HEAT SEALING APPARATUS

Filed April 13, 1972         10 Sheets-Sheet 3

United States Patent Office 3,810,806
Patented May 14, 1974

3,810,806
THERMOPLASTIC HEAT SEALING APPARATUS
Henry D. Swartz, 19 Mayflower Road,
Chestnut Hill, Mass. 02167
Continuation-in-part of application Ser. No. 156,865, June 25, 1971, now Patent No. 3,729,357. This application Apr. 13, 1972, Ser. No. 243,799
Int. Cl. B29c 19/02
U.S. Cl. 156—380
28 Claims

ABSTRACT OF THE DISCLOSURE

A weld or seal joining two or more heat susceptible thermoplastic sheets is produced by interposing the thermoplastic sheets in superposition between a flexible release member and a resilient backing member to form a surface-contacting assembly, and sliding a horizontally moving elongated heater mass along its axis in contact with the flexible release member of the assembly to apply heat to the thermoplastic sheets while countered by the resilient backing member. The result is a weld which is essentially uniform in thickness across its width and which may have a thickness which approximates the sum of the thicknesses of the sheets being welded. The weld may be broken periodically if desired. Apparatus for effecting this process and producing this product are disclosed.

---

This application is a continuation-in-part of my copending application Ser. No. 156,865, filed June 25, 1971, now Pat. No. 3,729,357, issued Apr. 24, 1973.

BACKGROUND AND SUMMARY

The present invention relates to the welding of thermoplastic sheets and, more particularly to apparatus and methods for welding together two or more thermoplastic sheets along one or more lines. The large welded sheets find use in construction materials as well as protective coverings and in other applications. For example, a double-walled plastic panelling having channels defined between pairs of welds may have rigid or flexible rods, cables or straps inserted in the channels to form rigid or flexible walls, roofs, coverings, etc. Difficulties have been encountered in producing welds of uniform appearance and strength throughout thermoplastic sheeting of large area. Such has been the case particularly with sheets of heavy-gage materials of certain polymeric compositions, particularly polyolefin composition (e.g., polyethylene and polypropylene) and vinyls. Sheets of such materials in general have been difficult to weld to each other because of their peculiar polymeric structure, particularly when in relatively heavy gage. Difficulties have also been encountered in sealing particular types of thermoplastics such as nylons, untreated Teflon® FEP films (completely fluorinated ethylenepropylene copolymer), biaxially oriented laminates with a narrow heat sealing range, etc.

All prior art techniques of sealing or welding thermoplastic materials have used either a stationary thermal heater mass or heated rollers; dielectric, radiant, ultrasonic or impulse energy; or solvents. Each of these techniques normally requires the establishment of an optimum combination of operational parameters, such as temperature, pressure and time. No one prior art technique, even with alterations in these operational parameters, is capable of being used to seal or weld all types of thermoplastics and none of them is satisfactory for handling large (e.g., 40-foot wide) sheets of material. Moreover, the quality of the seal or weld formed by such prior art techniques is not satisfactory, particularly in relatively wide, long continuous seals. The thicknesses of the seals or welds formed by these prior art methods vary considerably across their width, ranging in thickness from not much greater than the thickness of one of the sheets being sealed to greater than the thickness of both of the sheets. It is therefore apparent that there is a need for improved method and apparatus for heat sealing or welding thermoplastics.

A primary object of this invention is to provide an improved method of welding together two or more sheets formed of thermoplastic materials, the improvement residing in part in the formation of a weld which exhibits no appreciable degradation and an essentially uniform thickness that approaches the total thicknesses of the sheets being welded. Another object is to provide a method of the character described which is applicable to a wide variety of thermoplastics and a wide range of sheet thicknesses and which normally requires only a change in the speed at which the heater element is moved to adjust for different materials and different thicknesses. It is still another object to provide a method of welding large thermoplastic sheets to form construction material or to form welded sheets of extremely large dimensions.

It is another primary object of this invention to provide novel apparatus for welding thermoplastic materials including very large sheets. Still another object is to provide apparatus of the character described which may be used on all types of thermoplastics and on a wide range of thicknesses and which usually requires only a single adjustment in heater mass speed to change from one material or thickness to another.

Other objects of the present invention will in part be obvious and will in part appear hereinafter.

By the method and apparatus of this invention one or more linearly extending seals or welds is made to join two or more heat susceptible thermoplastic sheets by interposing the thermoplastic sheets in superposition between a flexible release member and a resilient backing member to form a sealing assembly, and sliding an elongated heating element along its axis in contact with the release member in order to apply sufficient heat to seal or weld the thermoplastic sheets while countered by the resilient backing member. An additional release member may be used over the backing member and preheating means may be used under the sheets to be welded if necessary. After formation of the weld the release member is separated from the weld. The release member preferably has a softening point at least 20% higher than the softening point of the thermoplastic sheets, typically being a high melting point flexible glass-reinforced polyester or fluorinated olefin. The resilient backing member also preferably has a softening point at least 20% higher than the softening point of the thermoplastic sheets, typically being a high-melting point elastomer such as a silicone rubber. The resilient backing member is supported on a horizontally oriented base support.

The resulting weld may be characterized as having in a preferred embodiment an essentially uniform thickness throughout its width, the weld thickness being substantially equal to the total thicknesses of the thermoplastic sheets being welded. Moreover, the weld exhibits no appreciable degradation of a physical or chemical nature.

In a preferred embodiment of the present invention the release member and the material to be sealed are precooled and postcooled along the line of travel of the heating element. It is known that precooling and postcooling lengthen the life of the release member and that precooling negates the effect of ambient temperature upon the sealing parameters. Postcooling minimizes the period during which the material is at the sealing temperature and results in faster cycle times. In another embodiment of the present invention a plurality of heating elements is used to produce predeterminedly spaced seals. The seals may be periodically broken along their lengths.

The invention accordingly comprises the apparatus, processes and articles of manufacture, together with their steps, parts, components, and interrelationships, which are exemplified in the present disclosure, the scope of which will be indicated in the appended claims.

BRIEF DESCRIPTION OF THE DRAWINGS

For a fuller understanding of the nature and objects of the present invention, reference should be had to the following detailed disclosure, taken in connection with the accompanying drawings, wherein.

DETAILED DESCRIPTION

Figure 4:
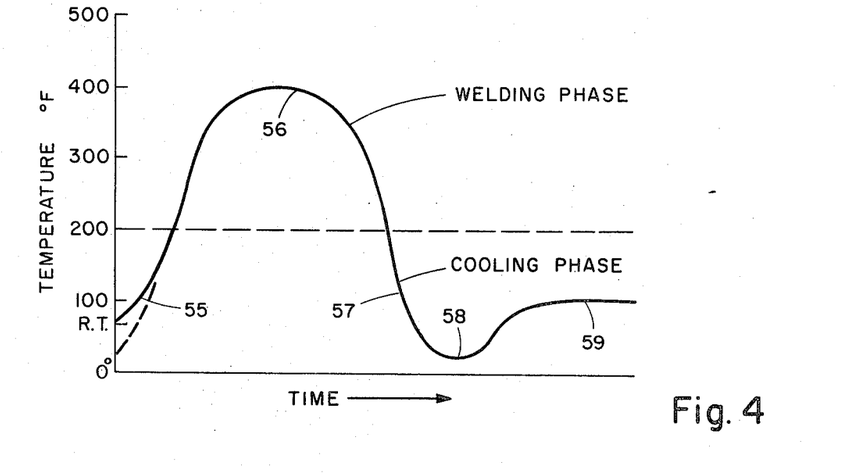
FIG. 4 is a graphic presentation illustrating certain principles of the present invention.
Figure 5:
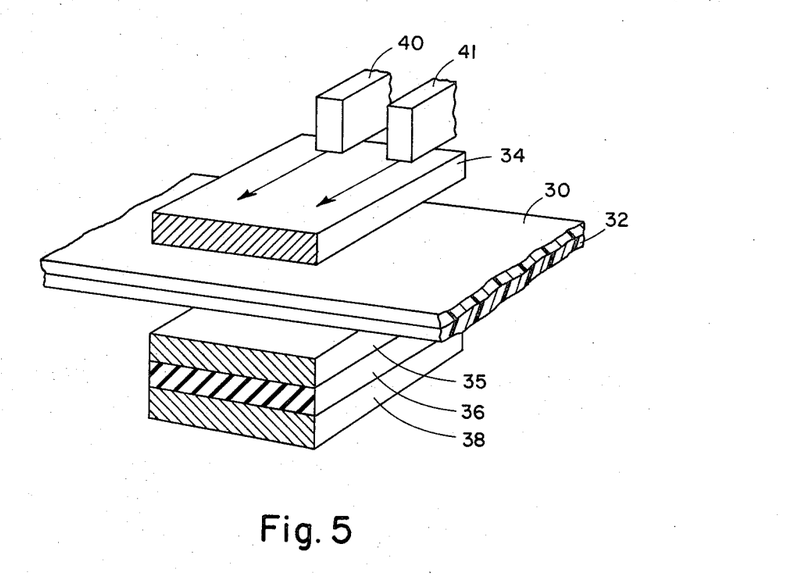
FIG. 5 illustrates materials, exaggerated in cross section for clarity, undergoing another embodiment of the process of this invention in which an auxiliary release member is used.
Figure 6:
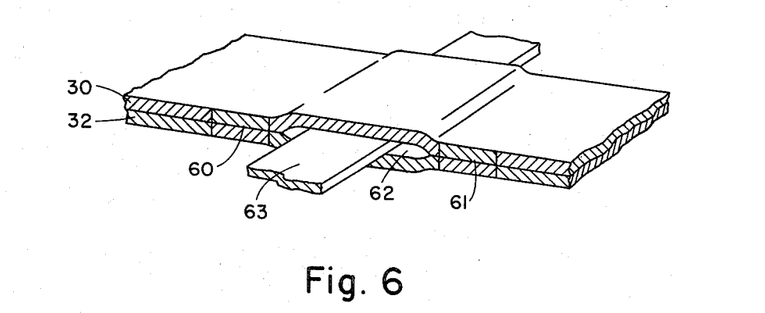
FIG. 6 illustrates a product of this invention.
Figure 7:
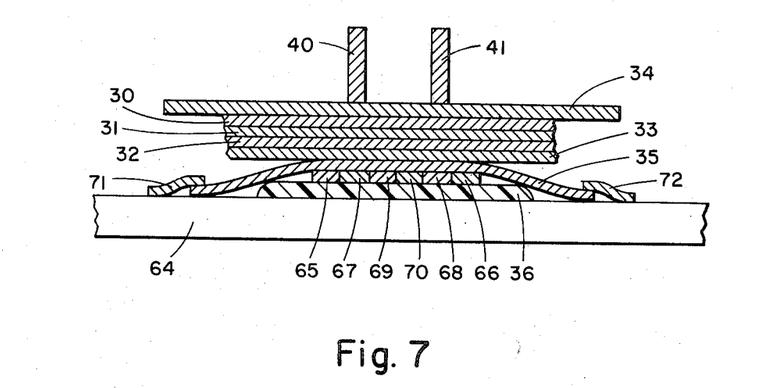
FIG. 7 is a cross section through an exemplary heating assembly which includes means for preheating.
Figure 8:
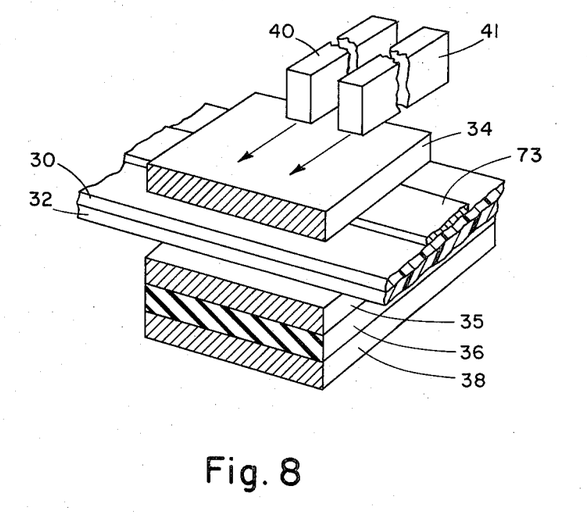
FIG. 8 illustrates materials, exaggerated in cross section for clarity, undergoing a modification of the process of this invention in which a heat insulating strip is used to periodically break the weld.
Figure 9:
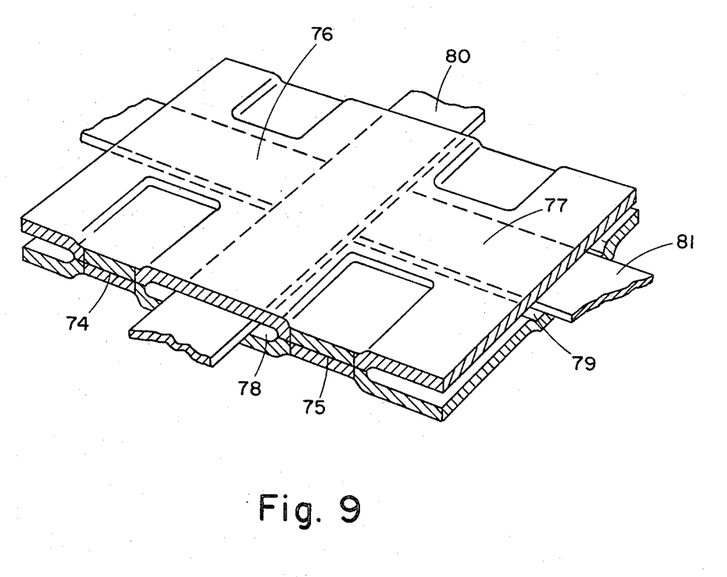
FIG. 9 illustrates another product of this invention resulting from the process illustrated in FIG. 8.

The method of this invention is illustrated schematically in FIGS. 1-5, 7 and 8; while exemplary welded products formed by this method are illustrated in FIGS. 6 and 9. Apparatus aspects of this invention are shown in detail in FIGS. 10-26.

Figure 1:
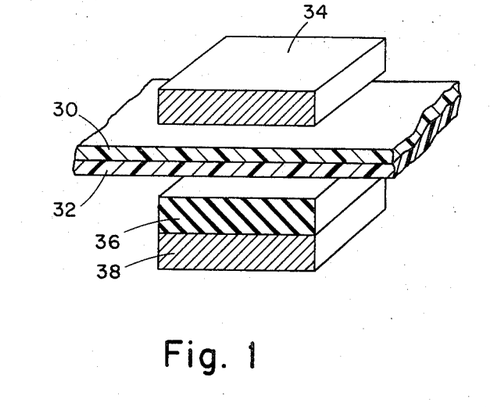
FIGS. 1-3 illustrates materials, exaggerated in cross-section for clarity, undergoing one embodiment of the process of the present invention.
Figure 2:
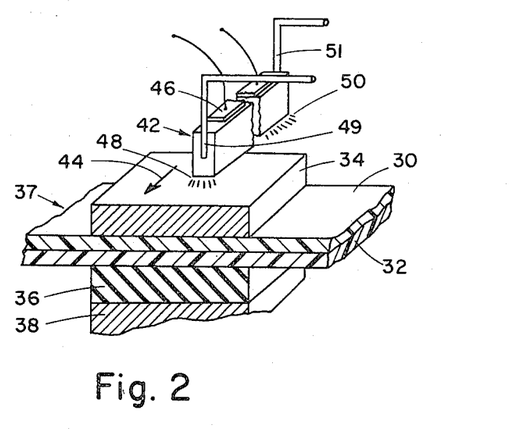
Figure 3:
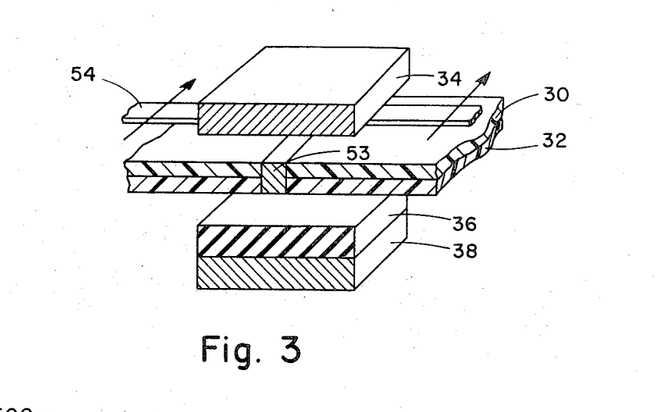

FIGS. 1-3 schematically illustrate one embodiment of the method of this invention wherein a single release member is used and a single weld is formed. In FIGS. 1 and 3 the components are shown in separated arrangement; however, they are in surface contact during welding. As shown in FIG. 1 the thermoplastic sheets 30 and 32 which are to be welded are positioned between a release member 34 and resilient backing member 36 which is supported on a rigid support base 38 such as the top of a table or horizontally oriented platform. During welding or sealing, the release member, thermoplastic sheets and resilient backing member are formed into a surface-contacting sealing assembly 37 as shown in FIG. 2. Both release member 34 and resilient backing member 36 are formed of materials which are inert to and have higher softening points than the thermoplastic sheets to be welded.

Subsequent to the positioning of sheets 30 and 32 between the release member and resilient backing member, a horizontally movable elongated heating element 42 (FIG. 2) is advanced in the direction 44 along its longitudinal axis which is parallel to the plane of release member 34, so that the lower edge 52 of the heating element remains in contact with any particular segment of release member 34 for a time interval which is a function of the length of heating element 42 along its axis and the speed of its travel in contact with the particular segment. The primary purpose of resilient backing member 36 is to insure continuous contact between the surface of heating element 42 and the thermoplastic sheets 30 and 32. As will be discussed below, the pressure applied to heating element 42 need be only that which is required to maintain firm slidable contact between heating element 42 and the sealing assembly therefore. It is necessary to compensate for any inability to maintain the apparatus absolutely level by the use of the resilient backing member.

Heating element 42, which is shown in detail in FIGS. 15, 17 and 19-22 is thermally controlled by an electrical resistance heating strip 46, and preferably moves in association with a precooling air jet 48 delivered from line 49 and a postcooling air jet 50 delivered from line 51. This precooling air stream 48 offers protection for release member 34 and prolongs its useful life; while also stabilizing the temperature of the thermoplastic sheets just prior to time when the heat element contacts release member 34. Postcooling air stream 50 rapidly cools the weld and controls its time at maximum temperature. This, in turn, permits the use of extremely high temperatures and light pressures and makes it possible to use heating time as the principal control parameter. Under the heat and light pressure applied by heating element 42, thermoplastic sheets 30 and 32 become permanently welded at 53, the weld having an essentially uniform thickness throughout which is substantially equivalent to the total thickness of sheets 30 and 32. After the formation of weld 53, release member 34 is stripped free from thermoplastic sheet 30 by a separator 54 which is shown in more detail in FIGS. 16-18 and described below.

The method and apparatus of this invention may be used to weld or seal any thermoplastic sheet material having at least one thermoplastic surface. Exemplary of such thermoplastic sheet materials which have been sealed or welded are polyethylene sheets ranging in total thickness from 0.002 to 0.060 inch, polyethylene containing such fillers as carbon and fire-retardant chemicals, Kraft paper coated on one side with polyethylene, two polyethylene sheets with a woven fiber glass reinforcing interposed between them, rubber hydrochlorides, spun-bonded nylon, heavy-gage (0.060 inch total) vinyls, completely fluorinated ethylene-propylene copolymers, polytetrafluoroethylene-coated cloths, and thin films which may be identified as biaxially-oriented laminates having a very narrow softening temperature range. The process and apparatus may be used to weld thermoplastic sheets of the same material of different thicknesses, thermoplastic sheets of two different compatible materials, as well as three or more chemically compatible thermoplastic sheets.

The pressure which the heating element applies to the release member, and hence to the sealing assembly, is that which is sufficient to maintain a firm slidable continuous contact between the heater surface of the heating element and the release member. Once established, this pressure need not be varied for different thicknesses or compositions of the thermoplastics being welded or sealed. Typically, this pressure is about 40 p.s.i.g., although it may be defined as ranging from between that required to just maintain continuous contact up to about 60 p.s.i.g. The optimum pressure to maintain the desired continuous contact may readily be determined by simple experimentation for any weld or seal to be formed.

The heating surface of the heating element which is moved along the release member is maintained at a temperature which is substantially above the normal heat-sealing temperature range (and hence above the softening temperature range) of the thermoplastic being sealed. The normal heat sealing temperature range is that temperature range wherein the thermoplastic is tacky and cohesive, and it is generally above the softening point of the thermoplastic. For example, in the case of the polyethylenes the heating surface of the heating element is maintained within a range from about 800 to about 1000° F. It is possible to use the same pressure and this same temperature range for all thicknesses of polyethylene by adjusting the amount of time during which contact is maintained between the heating surface and the release member. This means that the length of the heating surface as well as the speed at which the heating element is moved must be taken into consideration. Moreover, a heating element having a heating surface 24 inches long and maintained between 800 and 1000° F. can be used to seal or weld thermoplastics having sealing temperatures ranging from as low as 270° to as high as 700° F. in a wide range of thicknesses by varying the speed of travel of the heating element between about 30 and 120 feet per minute. The optimum contact time (e.g., heating element length and speed of travel) for any given set of operating conditions may readily be determined for any thermoplastic sheets to be welded or sealed.

For those materials which have very high or very low sealing temperature ranges or very narrow sealing temperature ranges, the temperature of the heating surface may be adjusted. In any case, however, this temperature is materially greater than the normal sealing-temperature range of the thermoplastic being sealed or welded.

Since the heat must be transferred to the thermoplastic sheets through the release member 34, this release member is preferably formed of a material which has a softening temperature range above that of the material being sealed and which is capable of withstanding periodic exposure to the high temperatures used. Ordinarily, the release member and resilient backing member will have softening points above about 600° F., release member 34 preferably ranging from about 2 to 10 mils in thickness and resilient backing member 36 ranging from 0.1 to 0.5 inch in thickness. Preferably, release member 34 is composed of a polyethylene terephthalate or a tetrafluoroethylene. A particularly effective composition for release member 34 is polyethylene terephthalate reinforced with encapsulated glass strands. Preferably, resilient backing member 36 is formed of a heat-resistant silicone elastomer. However, any resilient material capable of withstanding the heat to which the backing material is exposed may be used.

By the method of this invention it is possible to form better seals or welds in those thermoplastic materials which have heretofore been sealed by one of the prior art methods, and to seal thermoplastic materials which have heretofore not been satisfactorily sealable or weldable by any known prior art method. In this latter category of materials which could not be satisfactorily sealed are thermoplastics having low and narrow sealing temperature ranges as well as those having very high sealing temperature ranges.

Even though it is not possible to precisely and quantitatively identify the phenomena involved in the sealing method of this invention, it is possible to offer an explanation of why it achieves the results it does. Although the heating element advances at a continuous rate across the sealing assembly, it will be convenient in the following discussion to present this method of heat sealing in terms of what happens to a small segment of the superposed thermoplastic sheets lying directly under the path of advancement of the moving heater element. This is a valid approach since it can be postulated that only such a small segment under any one heater element is in a heat sealing condition at any one time.

Reference should be had to FIG. 4, which may be considered for illustrative purposes only to represent a typical cycle for sealing sheets of polyethylene. To begin the sealing the arrangement is such that the initial temperature of release member 34 in the path preceding the advancing heating element is at room temperature as at 55, or preferably below when a cold air jet is used for precooling. As the heating element advances, any one segment of release member 34 that it contacts, and hence any one segment of the superposed thermoplastic sheets, rapidly rises to a short-term dwell peak of 400° F. within its sealing temperature range as at 56. After the heating element breaks contact with this particular segment the temperature of this segment drops rapidly below 400° F. as at 57 under the cooling stream of postcooling air and continues to drop to the lowest point as at 58 thus rapidly resolidifying the sealed segment. Subsequently this segment returns to room temperature as at 59. It will be appreciated that because of the linear travel of the heating element, the weld time is controlled by the length of the heating element and its speed of advancement, this speed being such as to be adjustable in order to achieve a virtually perfect seal for any thermoplastic material being sealed or welded.

It will be seen from this illustrative model presented in FIG. 4 and from further consideration of the mechanism by which heat sealing is accomplished that at any one time a relatively small segment of the thermoplastic sheets is exposed to a short but finite period of high heating. This results from the use of a moving heat element and the stabilizing of the temperature (by precooling and postcooling) immediately before and after the heating of that segment. It therefore appears that by proper adjustment in the speed of any heater element of a given length, it is possible to raise the temperature of the thermoplastic sheet to its heat sealing temperature only in that area under the rearmost section of the moving heater element. This in turn means that the segment is brought up to heat sealing temperature quite rapidly and then brought down below its softening temperature very rapidly. It also means that there apparently exists a fairly sharp difference in the thermal condition of this segment under consideration and that portion of the sealing volume of the thermoplastic sheets adjacent both ends of the segment. That is, while the thermoplastic material within the segment volume is maintained at welding temperature the material immediately behind it has been cooled and the material immediately ahead of it has not yet softened. Thus, what might be termed "a path of least resistance" which can give rise to deformations is minimized. Moreover, the thermoplastic materials during welding by the method of this invention are not subjected to physical forces of any appreciable magnitude other than heat. The pressure is essentially minimal and since the thermoplastic sheets being welded are not under any appreciable tension, welding is accomplished by heat alone. This unique welding method gives rise to a strong uniform seal and makes possible the welding of thermoplastic sheets of any size, in particular very large sheets.

FIGS. 5, 7 and 8 illustrate additional embodiments of the method of this invention. FIG. 5, like FIGS. 1–3, is somewhat schematic and in these figures like reference numerals are used to identify like components shown in FIGS. 1–3.

In the embodiment illustrated in FIG. 5, a second or auxiliary release member 35 is placed on top of resilient backing member 36 to rest between it and thermoplastic sheets 30 and 32. This second release member 35 is formed of the same materials as are suitable for release member 34 and it is used to achieve additional heat control. The embodiment of FIG. 5 is generally preferred for sealing most thermoplastic materials. FIG. 5 also illustrates in schematic fashion the use of two parallel heating elements 40 and 41 to form parallel welds which produce an article of manufacture such as shown in FIG. 6.

FIG. 6 illustrates a product comprising the pair of thermoplastic sheets 30 and 32, having pairs of linear parallel seals 60 and 61, formed in accordance with the present invention, to define one or more channels 62 therebetween through which one or more elongated elements 63 may be inserted. For example, in one form each of elements 63 may be a rigid wooden strut or a plastic or steel strap. In another form each of elements 63 may be a cord, for example composed of fiber or plastic.

FIG. 7 shows, in cross section of the sealing assembly, another embodiment of the method of this invention including preheating means which are particularly suitable for sealing very heavy gage material and/or more than two sheets of material. The sealing assembly is supported on a table 64 (or other suitable support means) on which is mounted the resilient backing member 36. A plurality of heating strips 65–70 (for example flexible strips capable of generating resistance heating) are placed on the resilient backing member 36 and held in position by auxiliary release member 35 which in turn is sealed tautly to table 64 by retaining tapes 71 and 72 running along each side of auxiliary release member 35. The preheating strips 65–70 are connected in pairs (see FIG. 17) to a variable electrical power source so that it is possible to use the outside heating strips 65 and 66, the intermediately spaced heating strips 67 and 68 or the inner heating strips 69 and 70, or any other desired combination of strip pairs. The choice of strips which are used will be determined by the spacing between the adjustable parallel heating dies 40 and 41 used in the heating element. Thus as shown in FIG. 7, preheating strips 67 and 68, lying directly under heating dies 40 and 41, would be connected to the power source. Release member 34 is held (by means not shown here) over auxiliary release member 35 and, for example, four sheets 30–33 of thermoplastic material are superposed between them to complete the sealing assembly of FIG. 7. The preheating strips are generally used when very heavy gage materials or a number of sheets are to be sealed. The temperature of the preheating strips should be maintained below that temperature at which softening of the thermoplastic material occurs and is typically not above about 160° F.

FIG. 8 illustrates a modification of the method of the present invention, the thermoplastic sheets 30 and 32, release members 34 and 35 resilient backing member 36, and support 38 all being analogous to their counterparts in FIGS. 1–3 and 5. In the method illustrated in FIG. 8 a heat insulating strip 73 is interposed between release member 34 and thermoplastic sheets 30 and 32 and is positioned to extend transversely to the direction of travel of the heating dies 40 and 41. This heat insulating strip may be formed of the same material as release member 34, or it may be formed of any other suitable material capable of effecting high-temperature insulation. The heat insulating strip may, for example, range in thickness from about 15 to about 30 mils. The purpose of heat insulating strip 73 is to break the seal or weld, the length of the break being substantially equal to the width of the insulating strips.

When the elongated heating dies 40 and 41 are advanced in contact with release member 34 in accordance with the method modification of FIG. 8, an assembly of two sheets results as shown in FIG. 9. The seals 74 and 75 are interrupted at 76 and 77 as a result of the interposition of strip 73. Therefore, in addition to channels 78 formed by the welding of sheet 30 and 32, there are also transverse channels 79 formed by these breaks in the welds. The result is an assembly having a network of crossing channels through which bands 80 and 81 may be inserted to provide a reinforced construction material, tarpaulin, etc.

It will, of course, be appreciated that the embodiments and modifications of the method of this invention which are shown are illustrative only and that other combinations of the basic steps may be used. For example, the steps of thermally isolating sections of the seal or weld as shown in FIG. 8 may be applied to the embodiments of FIGS. 1, 5 and 7; multiple parallel dies or single dies may be used in any of the embodiments; or an arrangement such as shown in FIG. 7 may be used with the preheating strips.

FIGS. 10–26 illustrate apparatus suitable for carrying out the method of this invention.

Figure 10:
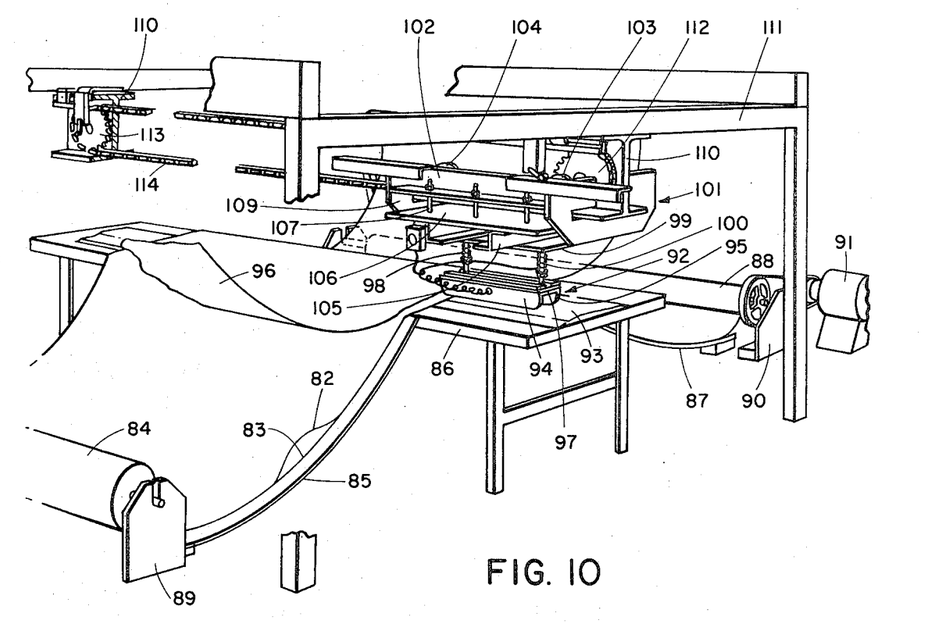
FIG. 10 is a perspective view, partly broken away of one embodiment of an apparatus for performing the process of this invention.
Figure 11:
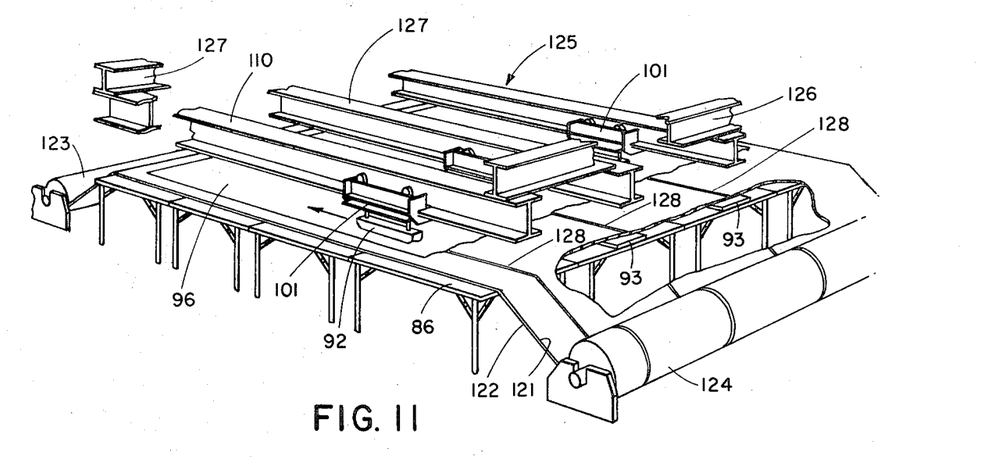
FIG. 11 is a schematic view of a system for welding seams along the length of thermoplastic sheets in accordance with the present invention.
Figure 12:
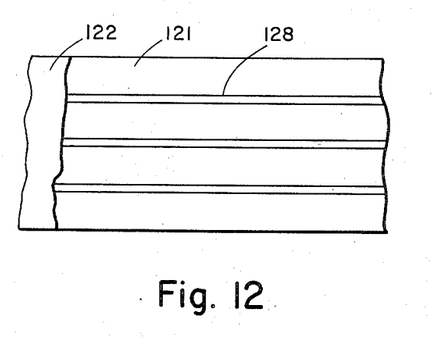
FIG. 12 is a top plan view of a fragmentary portion of sheets welded by the apparatus of FIG. 16.

FIG. 10 is a perspective, simplified drawing of one embodiment of the apparatus of this invention; while FIGS. 11 and 12 are simplified perspective and side elevational views, respectively, of apparatus, such as illustrated in FIG. 10, suitable for simultaneously forming a plurality of parallel pairs of welds either lengthwise or crosswise in large thermoplastic sheets.

Figure 15:
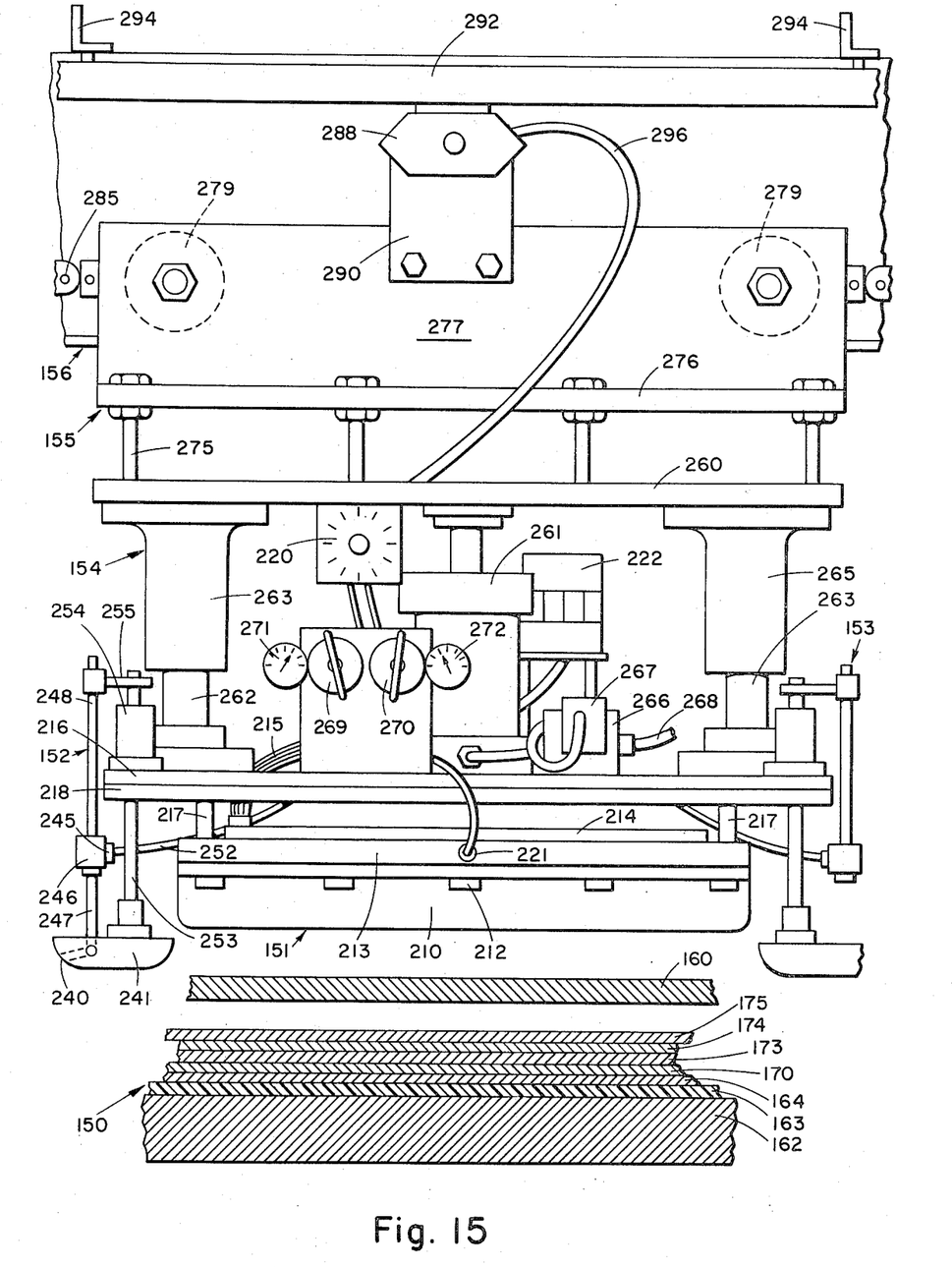
FIG. 15 is a side elevational view of a preferred embodiment of the sealing head in "at rest" position with a cross section of a segment of the sealing bed which is shown displaced from its location midway along the bed.
Figure 17:
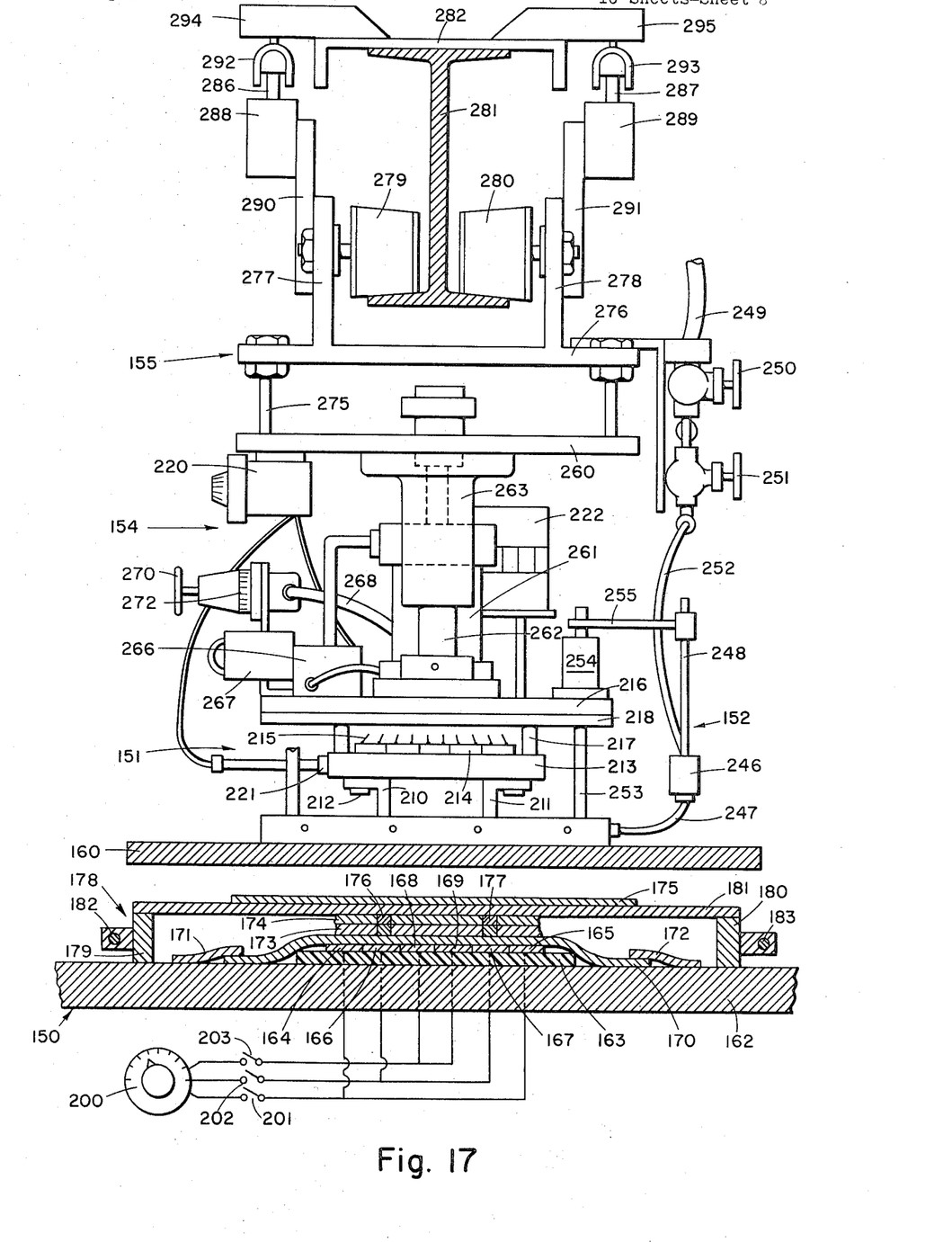
FIG. 17 is an end view of the apparatus of FIG. 15.

The apparatus shown in FIG. 10 is designed to weld a pair of spaced seams across two thermoplastic sheets 82 and 83 which are fed from a supply roll 84, over a first guide and support member 85, over a table 86, over a second guide and support member 87 to a take-up roll 88. Supply roll 84 is trunnioned on a support, part of which is shown at 89, and take-up roll 88 is trunnioned on a support, part of which is shown at 90. A suitable motor 91 or manual crank serves to advance sheets 82 and 83 into welding position on table 86. Extending along table 86 under the track of a sealing head, generally designated as 92, is an elastomeric pad 93 serving as the resilient backing member. Those sections of the thermoplastic sheets 82 and 83 which are under sealing head 92 rest on this backing member during welding. As shown in FIG. 10, the heating unit of sealing head 92 comprises an inverted channel of U-cross section defined by a pair of depending dies 94 and 95 serving as parallel heating elements, the lower edges of which transmit heat through release member 96 (in the form of a sheet) to thermoplastic sheets 82 and 83. The cross member 97 supporting the parallel heating dies 94 and 95 is supported by rods 98, the lower extremities of which are affixed to cross member 97 and the upper extremities of which are supported to be reciprocable in openings in a support plate 99. These rods are associated with helical springs 100 which extend between the support plate and the cross member in order to permit constant pressure to be exerted by the spring bias. Alternatively, as illustrated in FIGS. 15 and 17, the pressure may be controlled by use of a fluid system.

The heating unit is mounted on a carriage generally designated at 101. Carriage 101 comprises parallel right-angled support members (one being shown at 102) on which are journalled two pairs of rollers (one pair being partially shown at 103 and 104); a pair of angled support bars 105 oriented to be transverse to support plate 99 and to join it to a carriage plate 106; and a series of bolts 107 which affix carriage plate 106 to the right-angled support members and suspend the heating unit therefrom. Two end plates 108 and 109 protect the ends of the carriage.

Carriage rollers 103 and 104 are constrained for motion along the two sides of an I-beam 110 extending the entire length of travel of sealing head 92. The upper bar of I-beam 110 is supported by a main apparatus frame 111. A pair of sprockets 112 and 113 are mounted at each end of I-beam 110 and they are adapted to mesh with and drive a carriage driving chain 114. The carriage is affixed to chain 114 so that rotation of the sprockets causes advancement of sealing head 92 in one direction or the other. The carriage, heating means, precooling and postcooling means and apparatus control system are shown in detail in FIGS. 15 and 17.

Figure 13:
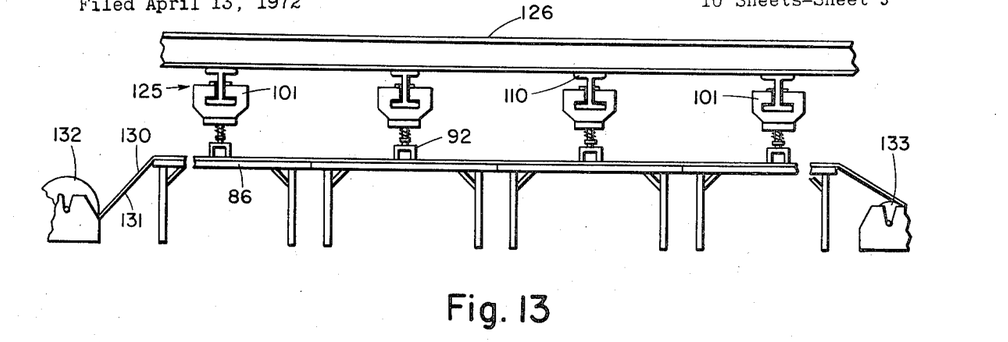
FIG. 13 is a schematic view of a system for welding seams running transverse to the length of thermoplastic sheets in accordance with the present invention.

FIGS. 11 and 13, in which like reference numerals are used to refer to like components shown in FIG. 10, illustrate the manner in which a plurality of seals or welds may be made lengthwise or crosswise in long lengths of thermoplastic sheets. In FIGS. 11 and 13, the heating units, their carriages, the precooling and postcooling means and the framework and main frame structures are either much simplified or eliminated for convenience in presenting these features of extending the method and apparatus to large thermoplastic sheets. Those components sketched in or not shown will, of course, be similar to those schematically illustrated in FIG. 10 and shown in detail in FIGS. 15–18 described below.

With reference now to FIG. 11, there is shown a series of tables 86, over which a pair of thermoplastic sheets 121 and 122 are periodically advanced from a supply roll 123 to a take-up roll 124. Affixed above the tables and the plastic sheets are a plurality of parallel I-beam suspension assemblies 125 such as shown in FIG. 10. These I-beam suspension assemblies 125 are in turn supported by transverse I-beams 126 and 127. The support of I-beams 110 by I-beams 126 and 127 may be achieved through the use of carriages (not shown but similar to the carriage illustrated in FIGS. 15 and 17) so that I-beam suspension assemblies 125 may be slidably moved along the lengths of I-beams 126 and 127 to adjust the spacing between the sealing head 92 and hence the spacings between the weld pairs 128. Since the sealing heads in FIG. 11 are advanced in a direction that is parallel with respect to the direction of the advancement of the sheets being welded, it is possible to weld any desired length of sheets as shown in FIG. 12.

Figure 14:
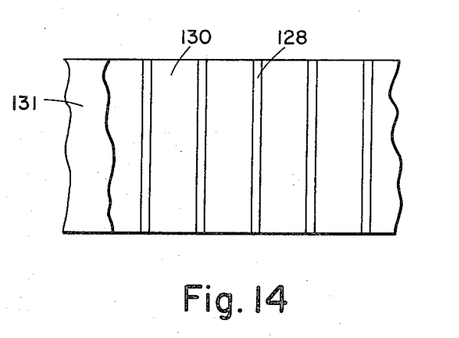
FIG. 14 is a top plan view of a fragmentary portion of sheets welded by the system of FIG. 18.

In the apparatus of FIG. 13, the sealing heads are moved in a direction which is transverse with respect to the direction of advancement of the thermoplastic sheets 130 and 131 which are periodically advanced from supply roll 132 to take-up roll 133. As in the case of FIG. 11, a plurality of I-beam support assemblies 125 are supported by transverse I-beams, and such support may be through carriage systems (not shown) which allow the I-beam support assemblies and hence the sealing heads 92 to be moved to adjust the spacings between them. The sheets processed in the apparatus of FIG. 13 have welds 134 running transverse with the sheet length as shown in FIG. 14.

As an example of the operation of the apparatus of FIGS. 11 and 13, a typical multiple sealing arrangement may contain from 2 to 16 sealing tracks that are adjustable from spacings ranging from 2 to 6 feet. Adding additional sealing tracks obviously increases the area sealed in one cycle. Typically a table surface area may be 50 by 100 feet (e.g., 5,000 square feet) making it possible to handle thermoplastic sheets 40 feet wide in continuous rolls normally containing 5000 lineal feet. Therefore a sheet 40 feet wide may be drawn onto the table area and left connected to the master roll while being sealed to provide crosswise or lengthwise seals or welds. The drive system of the sealing tracks operates under a control that assures accurate speeds over the desired range. Because of the large areas processed, the cost per square foot is low.

With the apparatus of FIGS. 11 and 13, it is possible to readily adjust the weld spacings, the number of welds formed at any one time and the length and widths of the sheets handled. Although tables 86 are illustrated as one form of support which is preferred because of the ease with which the supporting area can be changed, it will be appreciated that any other essentially flat, horizontally oriented supporting means may be used.

Figure 16:
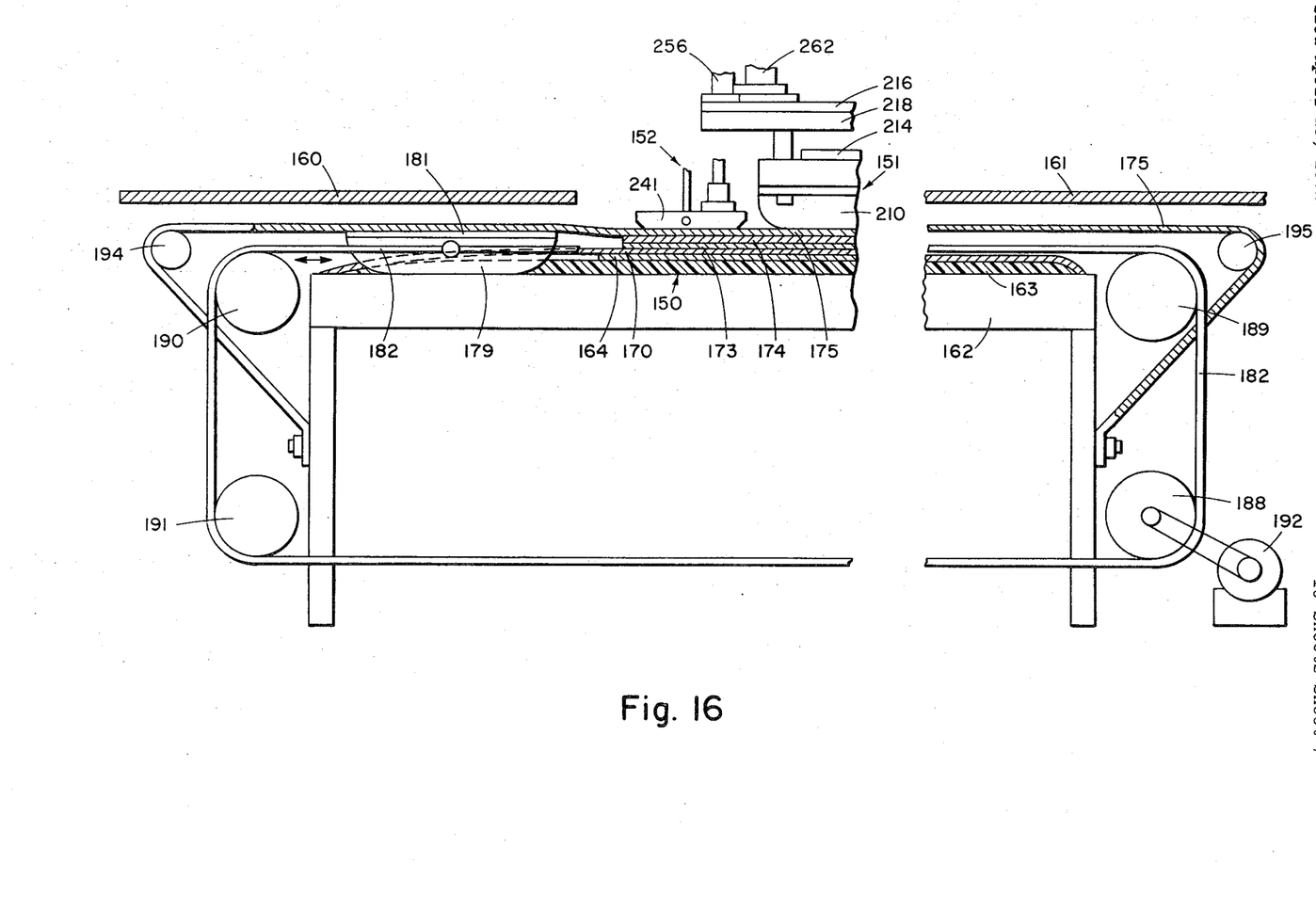
FIG. 16 is a side elevational view, partly in cross section, of one embodiment of the seal separator drive means and upper release member tensioning means such as would be suitable for the apparatus of FIG. 10.
Figure 18:
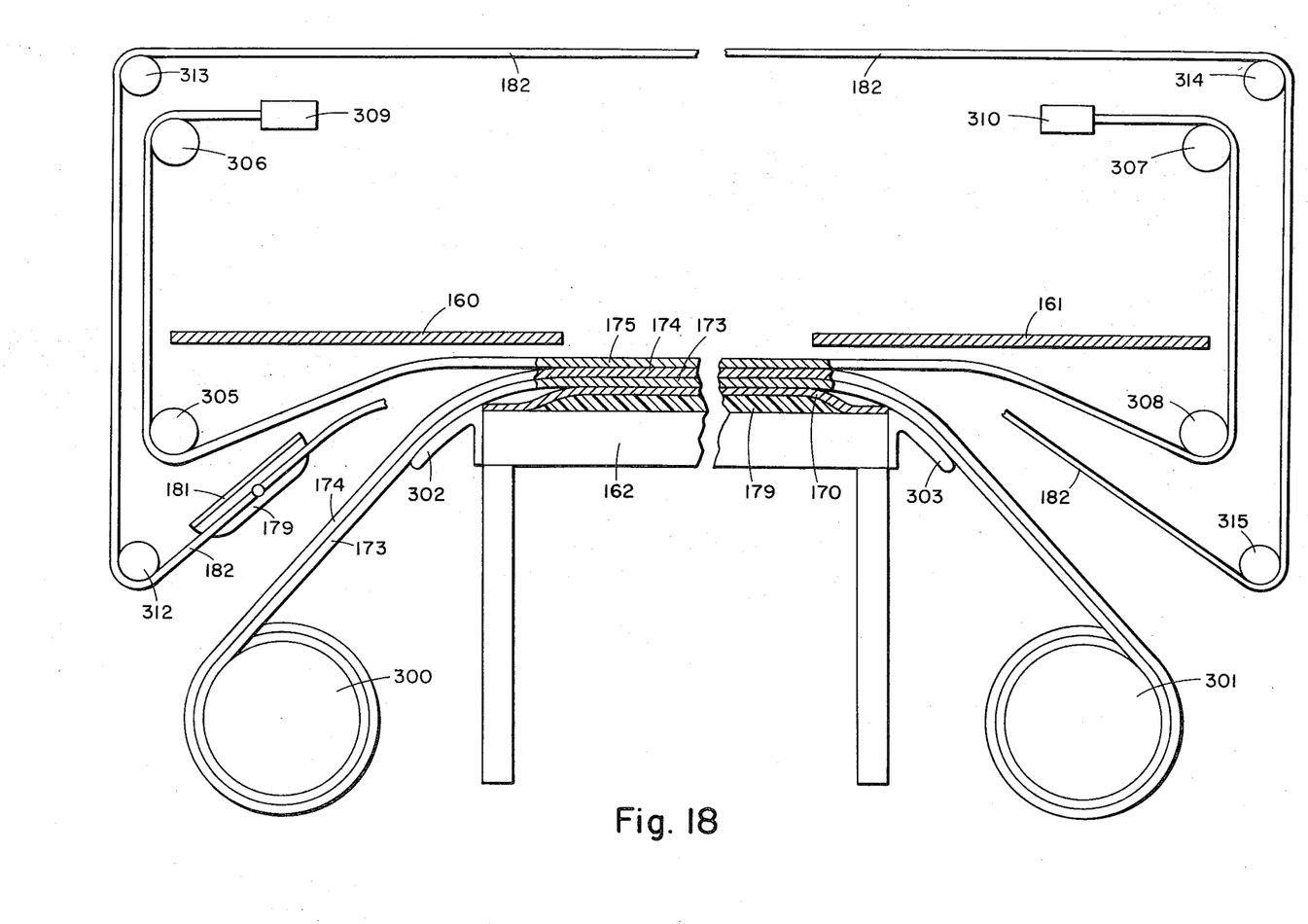
FIG. 18 is a side elevational view, partly in cross section, of another embodiment of the seal separator drive means and upper release member tensioning means such as would be suitable for the apparatus of FIG. 11.

FIGS. 15–17 are detailed side elevational and cross sectional views of a preferred embodiment of the complete sealing head and its carriage (i.e., 92 and 101 of FIG. 10) of this invention; while FIG. 18 illustrates a modification of the way in which the upper release member and seal separator are mounted to permit sealing discrete lengths of sheets to form very long continuous welds as shown in FIG. 11. Reference should be had to FIGS. 15–17, wherein like reference numerals are used to identifty like components, in the following description of this preferred apparatus embodiment. FIG. 15 shows the overall sealing head and carriage in a side elevational view positioned at rest at the end of a sealing run and the sealing assembly in fragmentary cross section taken along a plane cutting lengthwise through a central section of the sealing assembly bed. Likewise FIG. 17 shows the overall sealing head and carriage in an end view positioned at rest and the sealing assembly in cross section after sealing taken along a plane cutting crosswise through a central section of the sealing assembly bed. FIG. 17 also illustrates the use of the seal separator and the control of the pre-heating strip heaters.

For convenience in describing the apparatus of FIGS. 15–17, it may be considered to be comprised of a sealing assembly 150, a heater unit 151, precooling and postcooling units 152 and 153, a support assembly 154, a carriage 155 and carriage moving mechanism 156. In FIGS. 15 and 17 the heater unit 151 is shown in its raised or nonoperating position, that is the heater is raised above the level of the sealing assembly. Normally it occupies this position at one or the other end of a sealing run and it is positioned over thermal insulating plates 160 and 161 located at each end of the apparatus (FIG. 16) to protect the equipment and operators.

The sealing assembly 150 as illustrated is essentially that shown in FIG. 7 and comprises a rigid base support 162 (e.g., a table) a resilient backing member 163 affixed to the base support, strip heaters 164–169 (FIG. 17) a lower release member 170 held taut by retaining tapes 171 and 172, two thermoplastic sheets 173 and 174 to be sealed, and upper release member 175. As shown in FIGS. 16 and 17, after welds 176 and 177 are formed in thermoplastic sheets 173 and 174, the upper release member 175 is separated from the welded sheets by seal separator 178 which comprises two side members 179 and 180, a separator blade 181 supported by these side members and endless pulling cables 182 and 183 attached to the side members.

In the embodiment of FIG. 16, the pulling cables (only one of which is shown) are moved back and forth over four rolls 188–191 located to cause the cables to travel around the ends and under base support 162. Back and forth motion is imparted to the cables by motor 192 which drives roll 188 through belt 193. The upper release member 175 is maintained taut by stretching it over guide rolls 194 and 195 and affixing it to the ends of base support 162. Thermoplastic sheets to be welded in the apparatus of FIG. 16 must be moved in a direction normal to the plane of the drawing, thus making it possible to form welds in sheets which are somewhat narrower in width than the length of base support 162 to give a product such as shown in FIG. 14. As will be described below in conjunction with FIG. 18, the seal separator drive and upper release member tensioning means may be arranged to permit the forming of welds lengthwise in thermoplastic sheets.

Returning to FIG. 17, it will be seen that the preheating strip heaters 164–169 are connected in pairs through suitable switches to a variable electrical power source 200. Thus outside heaters 164 and 165 are connected through switch 201, intermediate heaters 166 and 167 through switch 202 and inner heaters 168 and 169 through switch 203. It is therefore possible to preheat only that portion of the thermoplastic sheets directly under the heating element. In the example illustrated, only the preheaing heater strips 166 and 167 would be used since they lie under welds 176 and 177.

The heating unit 151 comprises elongated heating dies 210 and 211, formed of steel, aluminum, bronze or other suitable metal, attached through bolts 212 to die plate 213 which in turn has a plurality of strip heaters 214 clamped to its upper surface. The strip heaters are preferably resistance heaters, formed for example of a suitable nickel-chromium alloy, and are connected to a suitable power source through leads 215. The heating unit is attached to the main support plate 216 of support assembly 154 by means of insulated stand-offs 217 and thermally insulated from it by heat insulating blanket 218. The control of the temperature of heating dies 210 and 211 is effected by means of a temperature control mechanism 220 which determines the heating die temperature by means of a thermocouple 221 set in die plate 213 and controls the flow of electrical current from the main power line through the use of heater contactor 222 which turns heaters 214 on and off to maintain a constant heating die temperature.

Figure 19:
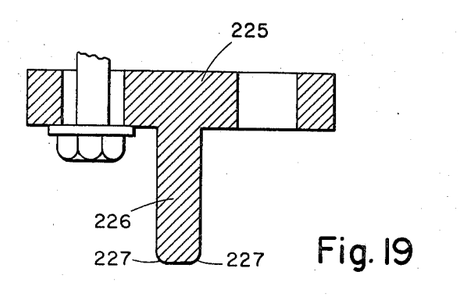
FIG. 19 is an end view of an embodiment of the heater element having a single heating die.
Figure 20:
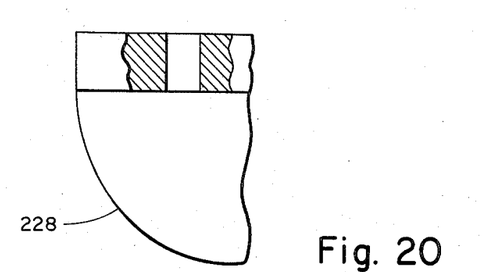
FIG. 20 is a side view, partially broken away, of the heater element of FIG. 19.
Figure 21:
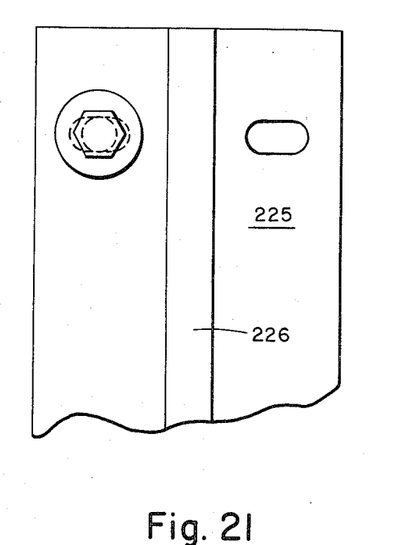
FIG. 21 is a bottom view, partly broken away, of the heater element of FIGS. 19 and 20.

The spacing between heating dies 210 and 211 (FIG. 17) may be adjusted to adjust the spacings between welds 176 and 177. This is done by moving bolts 212 in slots (not shown). It is also, of course, possible to form a single weld or seal, to form very wide seals or very narrow seals, or to form seals in thermoplastics which are in thin sheet form or which are made of materials having a very narrow and/or heat sealing temperature range. FIGS. 19–21 show a heating unit suitable for forming a single seal or weld. As will be seen, the heating unit is in the form of a cross piece 225 (die plate) and a depending heating die 226, the longitudinal edges of which are arounded at 227 and the forward and rearward edges of which are rounded at 228. Typically, the longitudinal edges are rounded with a ⅛-inch radius and the forward and rearward extremities are rounded with a 3-inch radius. This rounding of edges and ends of the heating dies is preferable in all die configurations. A typical heated element may be about 24 inches long with a highly polished precision ground heating surface.

Figure 22:
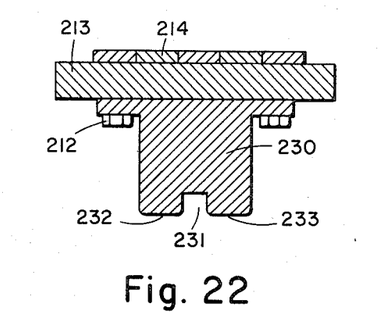
FIG. 22 is a cross sectional view of another embodiment of a heater element particularly suitable for forming wide welds.
Figure 23A:
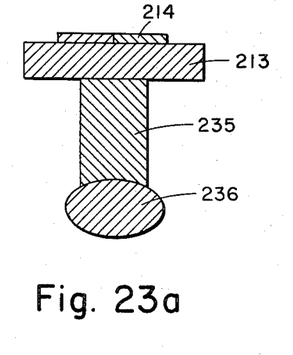
FIGS. 23a and 23b are cross sectional views of two other embodiments of a heater element particularly suitable for forming seals in materials having low heat sealing temperatures.
Figure 23B:
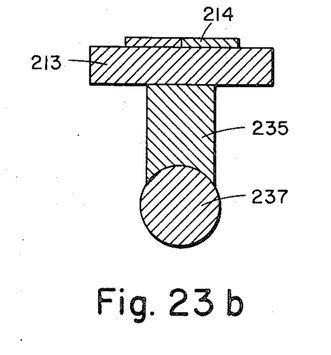

The heating element of FIG. 22 is particularly suited to the formation of wide seals or welds. The heating die 230 is grooved lengthwise to provide one or more grooves 231 along its central section, thus forming multiple spaced-apart heating element surfaces such as 232 and 233. This heating element configuration prevents the wider heavier heating die from forcing out softened material from the weld to form undesirable ridges along the weld edges. Sufficient heat is transferred across the space under the grooves to form in the thermoplastic sheets a continuous seal with a width essentially equivalent to the overall width of heating die 230. In applications where it is necessary to deliver heat to the thermoplastics and minimize the thermal transition at the seal edges as in low-temperature thin-gage sealing, the heating elements of FIGS. 23a and 23b may be used. The die comprises a vertical die strip 235 and a contacting die member 236 of ellipsoidal cross section (FIG. 23a) or a die member 237 of a circular cross section (FIG. 23b) affixed thereto. This contacting die member is designed to minimize deformation of very thin sheets or sheets formed of thermoplastics having low heat sealing temperatures or a narrow heat sealing temperature range.

In the embodiment of FIGS. 15 and 17, precooling and postcooling are accomplished by directing a plurality of streams of cold air directly in front and directly in back of the elongated heating dies. If in FIG. 15 it is assumed that the elongated heating element 151 is moving from right to left, then the precooling unit is 152 and the postcooling unit is 153. When the heating element travels in the opposite direction, then the precooling and postcooling units are, of course, reversed. Since these units are identical in construction and operation, it will be necessary to describe only precooling unit 152.

Cold fluid is directed onto the upper release member through a plurality of openings 240 in a cold plate 241 which is cooled by the cold fluid passing therethrough and which also cools the upper release member and through it the thermoplastic sheets being welded. If the release member is gas permeable, then the cooling air jet reaches the thermoplastic sheets by passing through the release member. However, some or all cooling of the thermoplastic sheets may be effected by conductive heat transfer through the release member. It is also, of course, within the scope of this invention to use a combination of these two cooling prcesses.

Figure 24:
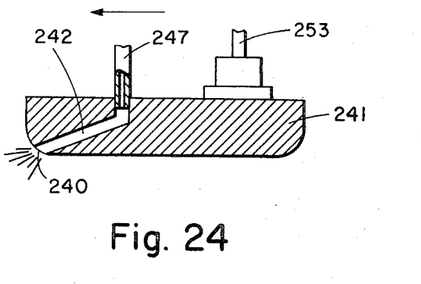
FIG. 24 is a cross section of the cold plate used in precooling and postcooling.

The cold plate 241 is shown in cross section in FIG. 24. The cold fluid entering cold plate 241 is directed through a channel 242 which in turn is in fluid communication with the openings 240, only one of which is illustrated. Although it is possible through any suitable heat exchange means to furnish cold fluid from an external source, it is preferable to use compressed air and effect its refrigeration through expansion within a commercially available vortex tube shown in FIG. 15 to include a compressed air inlet 245, a vortex generation chamber 246, a cold fluid outlet 247 and a hot fluid outlet 248. Compressed air is supplied through a main air line 249 (FIG. 17) and its flow is controlled by main air valve 250 and cooling air valve 251 which in turn controls the flow of air through line 252 to the vortex coolers.

Cold plate 241 is slidably mounted in main support plate 216 by means of a guide post 253 which is free to move through plate 216 and heat insulating blanket 218 in a bushing 255. Guide post 253 in turn carries the hot fluid outlet end 248 of the vortex cooler through arm 255. The cold plate is therefore free to rest on the upper heat control member under its own weight as the heater unit travels back and forth.

Figure 25:
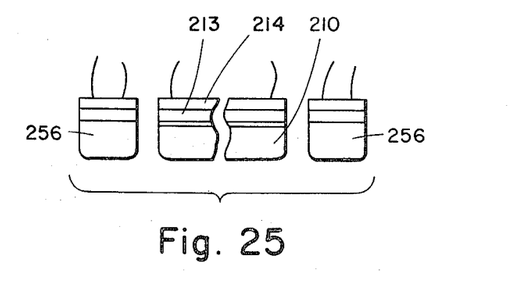
FIG. 25 illustrates another embodiment of precooling and postcooling means using Peltier cooling.
Figure 26:
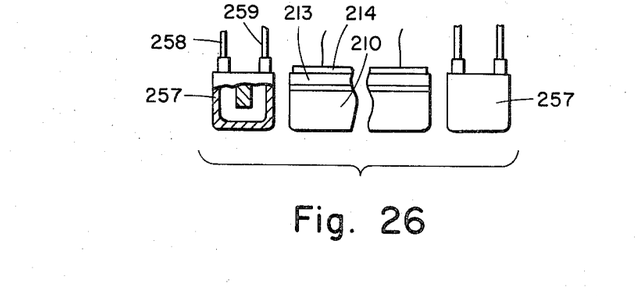
FIG. 26 illustrates a further embodiment of precooling and postcooling means using an externally supplied circulating fluid coolant.

Other precooling and postcooling means may be used, two modifications being shown in FIGS. 25 and 26. In the apparatus of FIG. 25 the cooling means are cooling wipers 256 embodying thermoelectric junctions which operate by the Peltier cooling effect. In the apparatus of FIG. 26 cooling plates 257, through which a suitable coolant fluid is circulated by being introduced through inlet line 258 and withdrawn through discharge line 259, are used.

The support assembly 154 serves as the means to support the heating unit, the precooling and postcooling units, and the auxiliary control equipment which regulates the heating element temperature and the pressure under which it contacts the sealing assembly. The support assembly comprises lower support plate 216 and upper support plate 260 which are held in adjustable spaced relationship through a supporting air cylinder 261. Two guide bars 262 and 263 at the ends of the support assembly and their associated bushings 264 and 265, respectively. Associated with air cylinder 261 is a cylinder control valve 266 controlled by electric solenoid 267. Air is supplied to cylinder 261 through line 268 which in turn is supplied from main air line 249 through valve 250. The fluid pressure in cylinder 261 is controlled by pressure regulators 269 and 270, one of which is used to adjust the air pressure to counteract the weight of the support assembly, including those components supported by it, and the other of which is used to adjust the pressure applied by the heating elements onto the sealing assembly.

Pressure gages 271 and 273 are associated with regulators 269 and 270, respectively.

The support assembly, along with all those components supported thereby, is in turn supported from carriage 155 by a plurality of leveling bolts 275. Carriage 155 comprises a horizontal member 276 and two parallel vertical members 277 and 278 in each of which is rotatably mounted a pair of rollers 279 and 280. These rollers move over the two upper surfaces of the lower cross member of an I-beam 281 bolted to a main frame 282. Carriage 155 is attached to driving chain 285 and is powered through bus bars 286 and 287 which are part of electrical power pickoff systems 288 and 289 mounted through plates 290 and 291 to the carriage. Protective shields 292 and 293, hung from angle supports 294 and 295, are provided along the length of carriage travel and power is brought into the carriage moving mechanism through main cable 296.

FIG. 18 illustrates an embodiment of the apparatus which is designed to weld long sheets of thermoplastics lengthwise by welding a discrete length and then moving the sheets in position to continue the weld over another discrete length as shown in FIG. 11. In FIG. 18, like components are identified by the same reference numerals used in FIGS. 15–17 and the preheating means have been omitted. In order to be able to move the sheets 173 and 174 from supply roll 300 to takeup roll 301 over guides 302 and 303 across rigid base support 162, a clear passage must be provided. This is done by using overhead tensioning means for upper release member 175 and overhead driving means for the seal separator. Thus, upper release member 175 is tensioned over rollers 305–308 mounted on the apparatus frame (not shown) and held taut by suitable tensioning means 309 and 310 mounted above the sealing head. Likewise, guide rollers 312–315 around which seal separator cable 182 travels, are mounted on the main apparatus frame to permit driving cable 182 to travel overhead.

It will be seen from the above detailed description that the present invention thus provides a novel method and apparatus for welding or sealing thermoplastic sheets of a variety of compositions, thicknesses and sizes. It will further be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

I claim:

1. An apparatus for sealing thermoplastics in sheet form, comprising in combination
   (a) a resilient backing member;
   (b) an upper release member disposed above said backing member to permit thermoplastic sheets to be sealed to be interposed between them to form a surface-contacting sealing assembly of backing member, thermoplastic sheets and release member;
   (c) an elongated horizontally movable heater means, the heating surface of which is adapted to make contact with the surface of said release member of said sealing assembly; and
   (d) heater moving means adapted to move said heater means in contact with said release member at a predetermined speed.

2. An apparatus in accordance with claim 1 including a lower release member positioned over said resilient backing member.

3. An apparatus in accordance with claim 1 including preheating means on said resilient backing member adapted for preheating said thermoplastic sheets along the path of travel of said movable heater means.

4. An apparatus in accordance with claim 3 wherein said preheating means comprise a plurality of strip electrical resistive heating means arranged to be activated so that said thermoplastic sheets are preheated within the area under said heating surface of said movable heater mass.

5. An apparatus in accordance with claim 1 including means to cool said sealing assembly ahead of and behind said heater means as it moves.

6. An apparatus in accordance with claim 5 wherein said means to cool said sealing assembly comprises means to direct a stream of cold fluid onto said upper release member and through it onto said thermoplastic sheets.

7. An apparatus in accordance with claim 5 wherein said means to cool said sealing assembly comprises cold plate means adapted to contact said upper release member and to direct cold fluid onto said upper release member and through it onto said thermoplastic sheets.

8. An apparatus in accordance with claim 1 including separator means adapted to separate said upper release member from said thermoplastic sheets after seal formation and means to move said separator means between said upper release member and the upper one of said thermoplastic sheets.

9. An apparatus in accordance with claim 8 wherein said means to move said separator means comprises endless cable means, cable-engaging roller means and means to move said cable.

10. An apparatus in accordance with claim 1 including a plurality of thermally insulating means adapted to thermally isolate spaced areas of said thermoplastic sheets along the line of heater means travel whereby said seal is intermittent.

11. An apparatus in accordance with claim 1 including base support means to support said sealing assembly.

12. An apparatus in accordance with claim 1 including means to hold said upper release member in tension.

13. An apparatus in accordance with claim 1 wherein said lower resilient backing member and said upper release member are formed of materials having softening points above the softening points of said thermoplastic sheets.

14. An apparatus in accordance with claim 1 wherein said elongated movable heater means comprises heating die means providing said heating surface, a die plate by which said heating die means is supported and resistive heating means in heat exchange relationship with said die plate.

15. An apparatus in accordance with claim 14 wherein said heating die means comprises a single die.

16. An apparatus in accordance with claim 15 wherein said single die is relatively wide and has a central groove extending lengthwise.

17. An apparatus in accordance with claim 15 wherein said single die terminates in a die member having an ellipsoidal or circular cross section.

18. An apparatus in accordance with claim 14 wherein said heating die means comprises parallel spaced apart dies.

19. An apparatus in accordance with claim 1 wherein said heater moving means comprises a carriage, carriage track means and means to move said carriage on said carriage track means.

20. An apparatus for simultaneously forming a plurality of parallel welds in thermoplastic sheets, comprising in combination:
   (a) base support means;
   (b) a plurality of parallel spaced apart resilient backing members supported on said base support means;
   (c) a plurality of parallel spaced apart lower release members, each one of which tautly covers one of said backing members.
   (d) a plurality of parallel spaced apart upper release members, each one of which is aligned with and disposed above one of said covered backing members to permit thermoplastic sheets to be sealed to be interposed between said lower and upper release members to form a plurality of surface-contacting welding assemblies, each of which comprises a backing member, thermoplastic sheets and an upper and lower release members;

(e) a plurality of elongated horizontally movable heater means, the heating surface of each one of which is adapted to make contact with a surface of one of said upper release sheets of said welding assemblies;

(f) a plurality of welding assembly cooling means adapted to cool each of said welding assemblies ahead of and behind each of said heater means as it moves;

(g) a plurality of weld separator means adapted to separate said upper release members from said thermoplastic sheets after formation of said welds; and (h) a plurality of heater moving means, each heater moving means being adapted to move one of said heater means in firm slidable contact with its associated heat control member at a predetermined speed, thereby to form a plurality of parallel welds in said thermoplastic sheets.

21. An apparatus in accordance with claim 20 including a plurality of thermally insulating means adapted to thermally isolate spaced areas of said thermoplastic sheets along the lines of heater means travel whereby the parallel welds formed are intermittent.

22. An apparatus in accordance with claim 20 wherein each of said heater moving means comprises a carriage, carriage track means adapted to move said carriage on said track means and carriage track support means running transverse to said carriage track means adapted to support said carriage track means.

23. An apparatus in accordance with claim 22 including means to move said carriage track means on said carriage track support means thereby providing means to adjust the spacing between the parallel welds formed in said thermoplastic sheets.

24. An apparatus for sealing thermoplastics in sheet form, comprising in combination:
(a) a resilient backing member;
(b) a lower release member positioned over said resilient backing member;
(c) an upper release member disposed above said backing member and said lower release member to permit thermoplastic sheets to be sealed to be interposed between said release members to form a surface-contacting sealing assembly of backing member, thermoplastic sheets and release members;
(d) means to hold said upper release member in tension;
(e) base support means to support said sealing assembly;
(f) an elongated horizontally movable heater means, the heating surface of which is adapted to make contact with the surface of said upper release member of said sealing assembly, said elongated movable heater means comprising heating die means providing said heating surface, a die plate by which said heating die means is supported and resistive heating means in heat exchange relationship with said die plate;
(g) means to cool said sealing assembly ahead of and behind said heater means as it moves;
(h) heater moving means adapted to move said heater means to contact with said upper release member at a predetermined speed, said heater moving means comprising a carriage, carriage track means and means to move said carriage on said carriage track means;
(i) separator means adapted to separate said upper release member from said thermoplastic sheets after seal formation; and
(j) means to move said separator means between said upper release member and the upper one of said thermoplastic sheets.

25. An apparatus in accordance with claim 24 wherein said means to cool said sealing assembly comprises means to direct a stream of cold fluid onto said upper release member and through it onto said thermoplastic sheets.

26. An apparatus in accordance with claim 24 including preheating means on said resilient backing member adapted for preheating said thermoplastic sheets along the path of travel of said movable heater means.

27. An apparatus in accordance with claim 24 including a plurality of thermally insulating means adapted to thermally isolate spaced areas of said thermoplastic sheets along the line of heater means travel whereby said seal is intermittent.

28. An apparatus in accordance with claim 24 wherein said means to hold said upper release member is tension and said means to move said separator means are located above said base support means thereby permitting discrete unbroken lengths of said thermoplastic sheets to be sealed continuously lengthwise along said sheets.

References Cited

UNITED STATES PATENTS

| | | | |
|---|---|---|---|
| 2,574,094 | 11/1951 | Fener et al. | 156—583 |
| 2,682,294 | 6/1954 | Langer | 156—583 X |
| 2,743,761 | 5/1956 | Snyder et al. | 156—583 |
| 3,005,402 | 10/1961 | Starger et al. | 156—583 X |

WILLIAM A. POWELL, Primary Examiner

U.S. Cl. X.R.

156—199, 272, 290, 306, 459, 543, 583